May 10, 1927.
M. J. WEBER
SCALE
Original Filed Oct. 10, 1921　　4 Sheets-Sheet 1
1,628,205
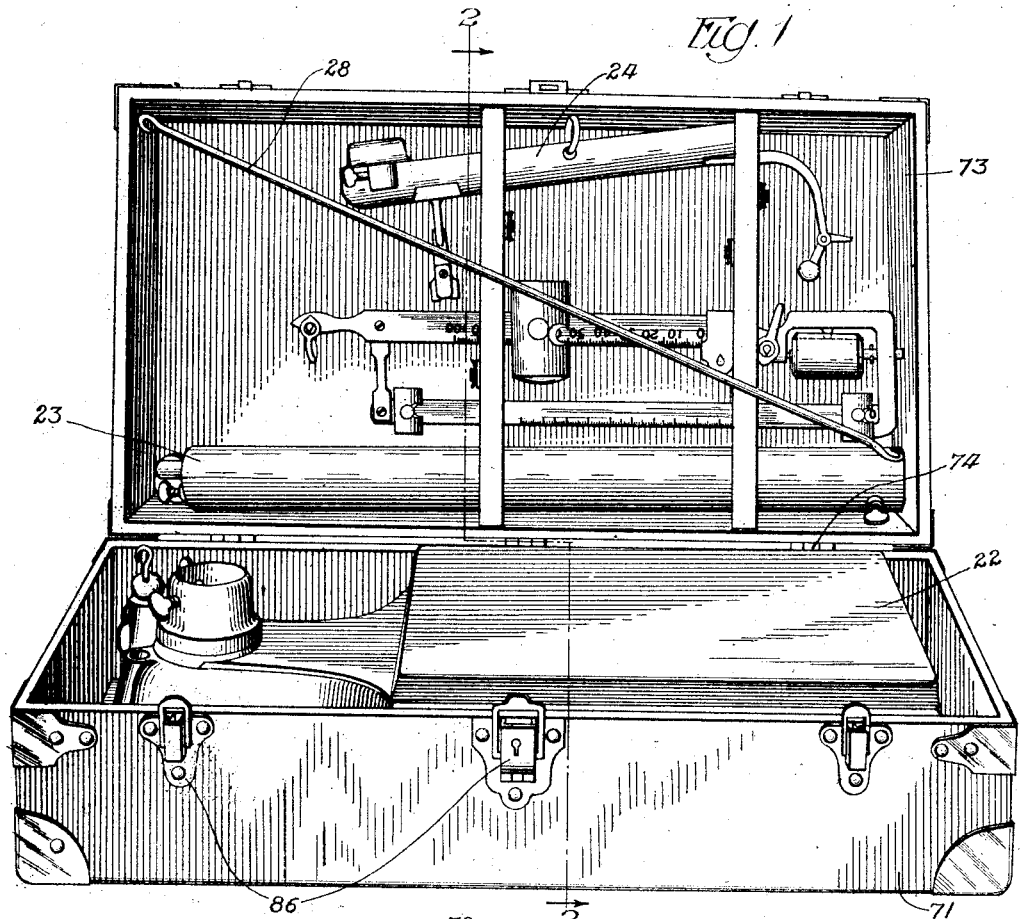
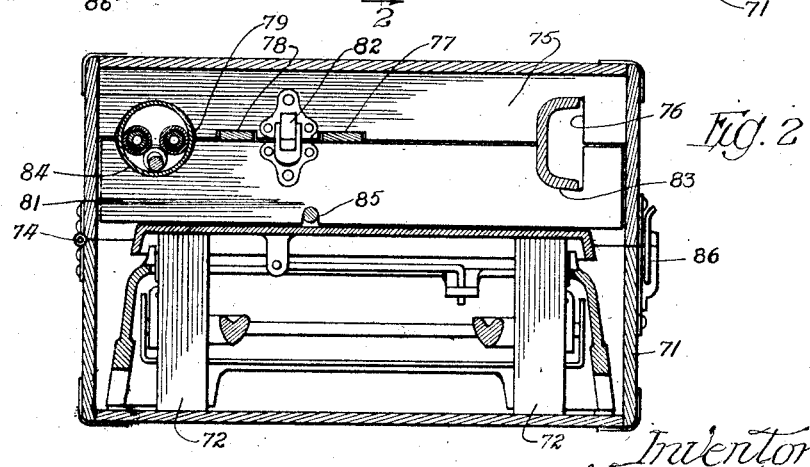

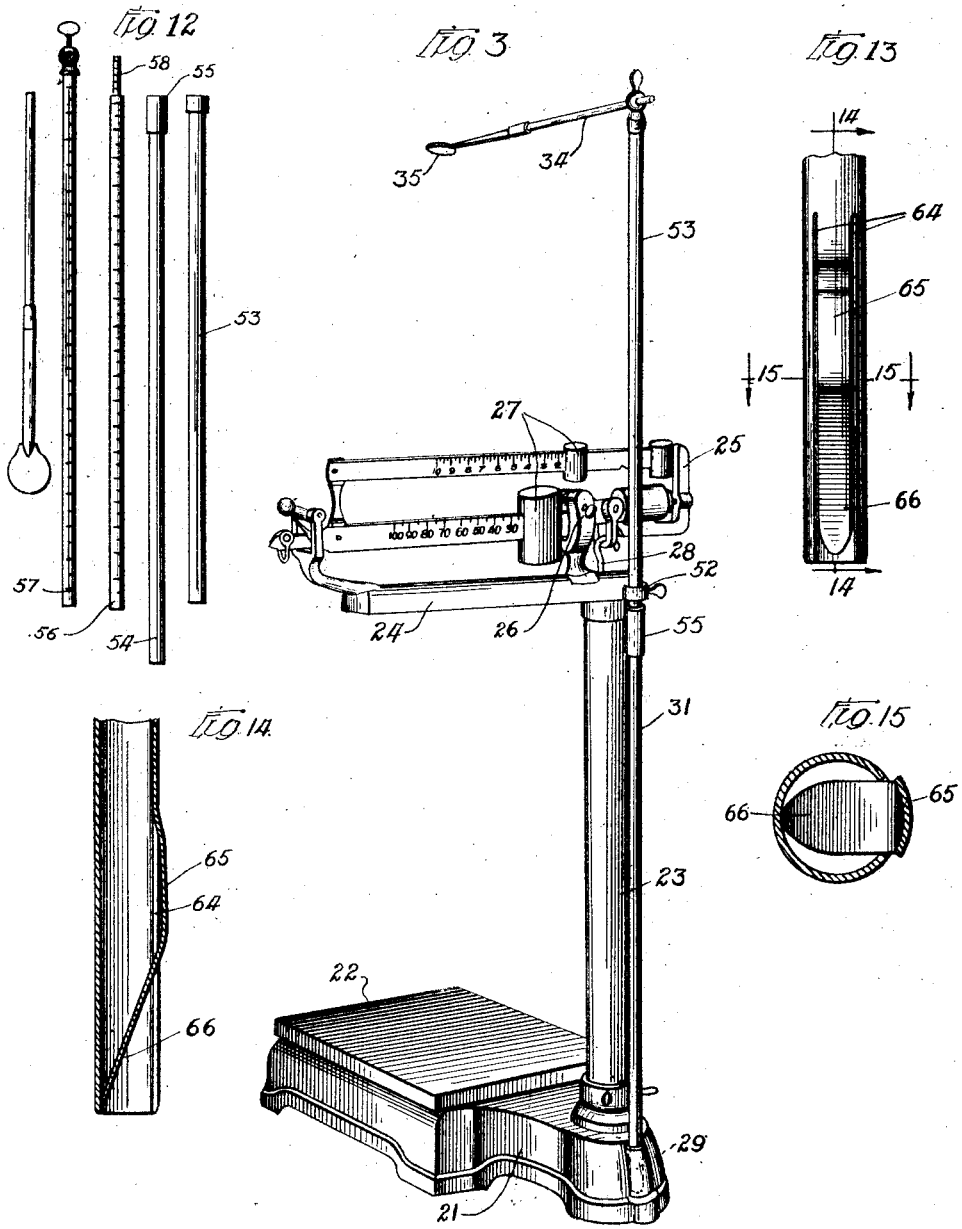

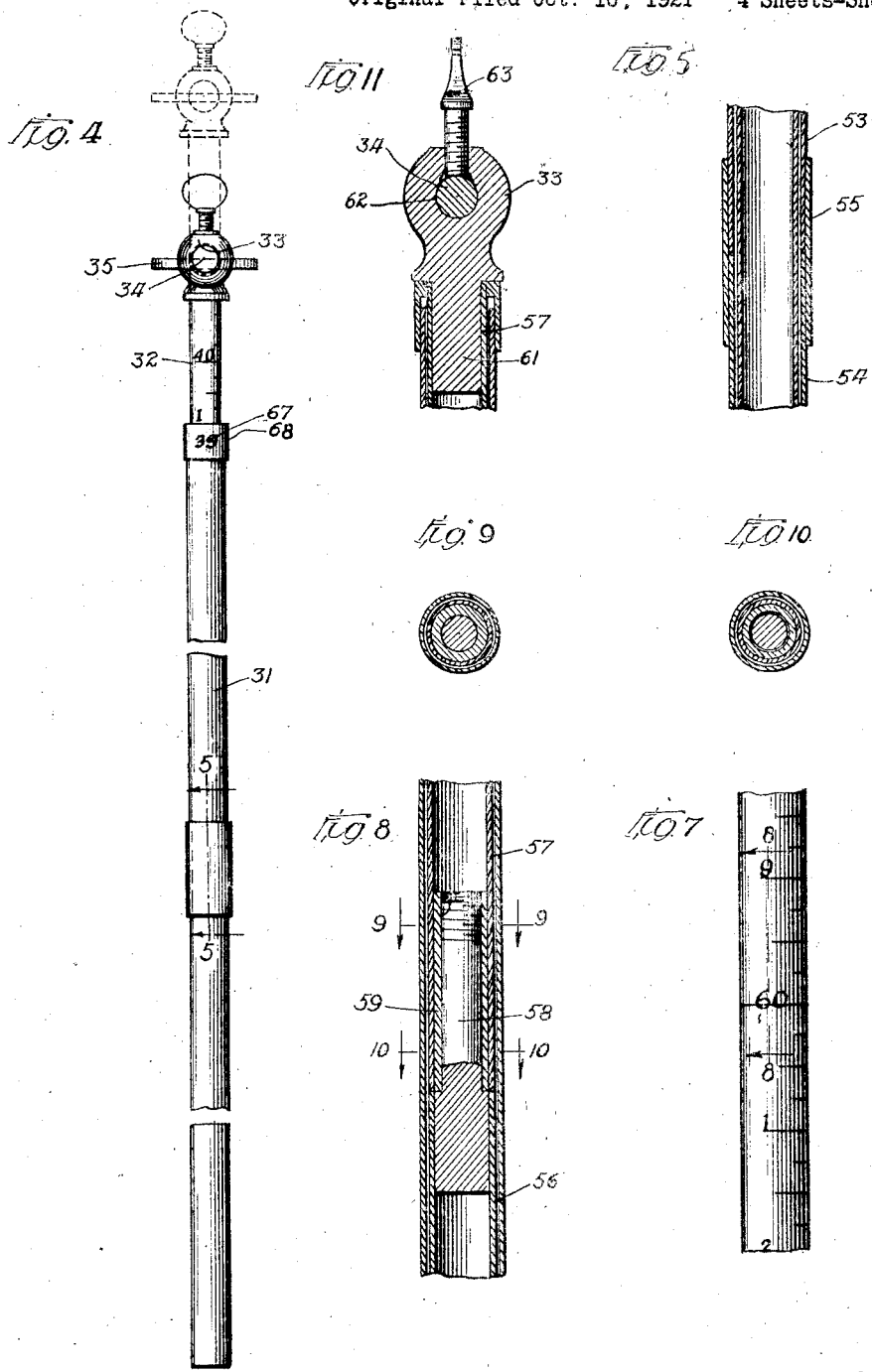

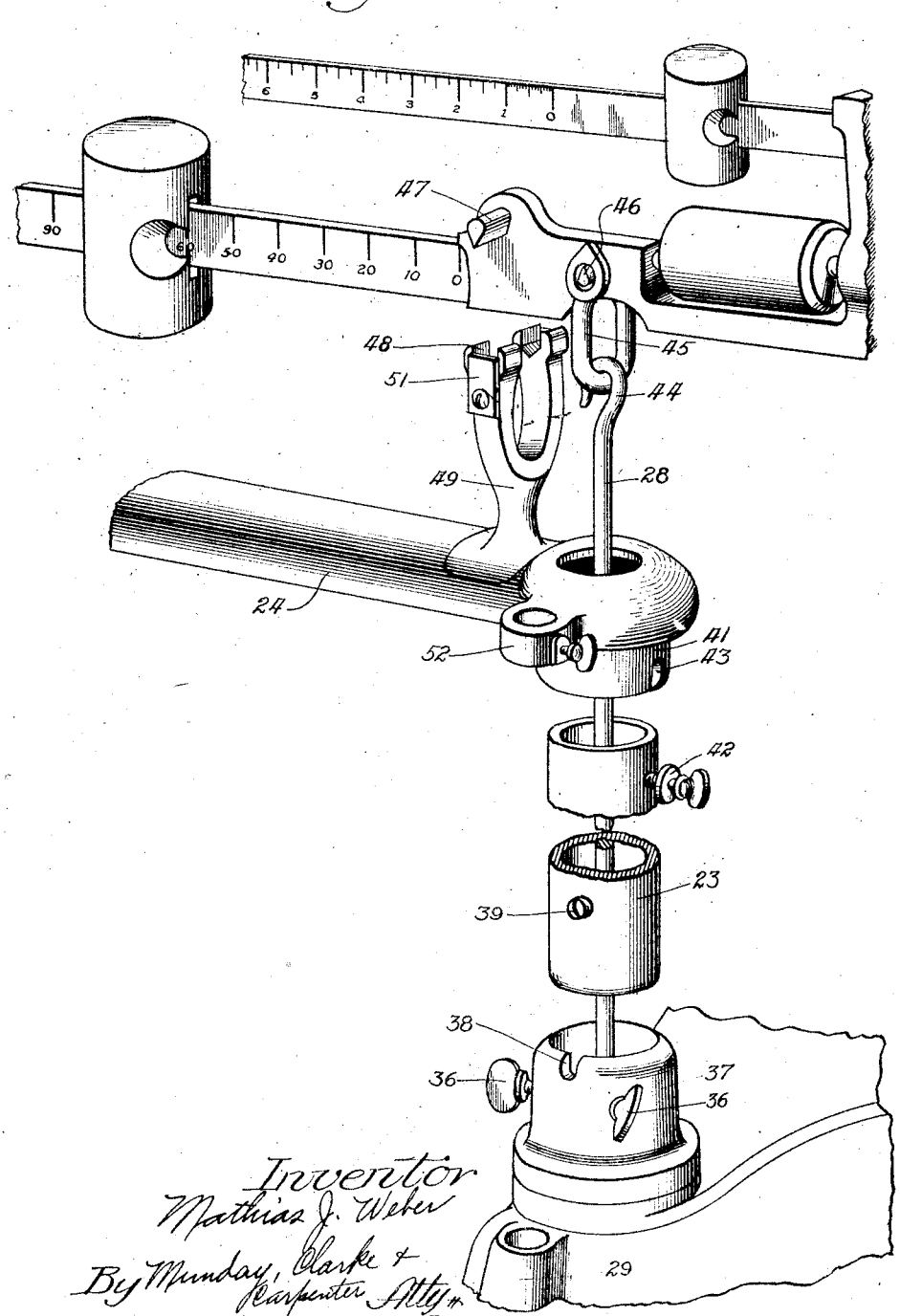

Patented May 10, 1927.

1,628,205

UNITED STATES PATENT OFFICE.

MATHIAS J. WEBER, OF CHICAGO, ILLINOIS, ASSIGNOR TO CONTINENTAL SCALE WORKS, OF CHICAGO, ILLINOIS, A CORPORATION OF ILLINOIS.

SCALE.

Application filed October 10, 1921, Serial No. 506,656. Renewed March 26, 1927.

This invention relates in general to weighing and height measuring devices and while the invention has more particular reference to outfits of this character provided for physicians, health officers and the like, it will be manifest that numerous features of the invention are capable of valuable use in other connections.

The principal object of the present invention is the provision of a weighing and height measuring outfit which while being of practical size and having the usual height measuring range, may still be arranged within small compass for easy transportation from one locality to another.

A principal use of the invention is intended to be by visiting health officers, school doctors in rural communities, and the like, and the invention contemplates an outfit which may be packed in (and from certain aspects of the invention include) a container of a size not greatly in excess of that of an ordinary suitcase.

The invention has for a further important object the provision of a scales outfit which may be conveniently taken apart from operative condition and conveniently stored in a container.

It has for a further important object complete protection against any damage to any of the more delicate parts from rough handling in transit.

The invention has for another important object the provision of a height measuring device which may be taken apart and arranged within small space and which when assembled will be of sure and efficient action.

Numerous other objects and advantages of the invention will be apparent as it is better understood from the following description which taken in connection with the accompanying drawings illustrates a preferred embodiment thereof.

Referring to the drawing.

Figure 1 is a perspective view of my outfit arranged for transportation.

Fig. 2 is a view taken substantially on the line 2—2 of Figure 1.

Fig. 3 is a perspective view of the scales and height measuring device assembled for use.

Fig. 4 is an enlarged side elevation of the height measuring device.

Fig. 5 is a section taken substantially on the line 5—5 of Figure 4.

Fig. 6 is a fragmentary perspective view with parts broken away, showing an arrangement of the scales when set up.

Fig. 7 is a partial and still further enlarged elevation of the height measuring device.

Fig. 8 is a section taken substantially on the line 8—8 of Figure 7.

Fig. 9 is a section taken substantially on the line 9—9 of Figure 8.

Fig. 10 is a section taken substantially on the line 10—10 of Figure 8.

Fig. 11 is enlarged partial vertical section through the top of the height measuring device.

Fig. 12 is a view of the measuring device taken apart.

Fig. 13 is an enlarged side elevation of the lower end of the inner tube of the height measuring device.

Fig. 14 is a section taken substantially on the line 14—14 of Figure 13.

Fig. 15 is a section taken substantially on the line 15—15 of Figure 13.

As has already been stated, my present invention relates to a scales and height measuring device organization adapted for ready and safe transportation from one locality to another and in order that the invention may be best understood, I will first describe the scales and height measuring device shown on the drawing as erected or assembled for use.

Referring to Figure 3, reference character 21 indicates a base in general of any usual or preferred construction. Upon this is mounted the usual weighing platform 22. From the forward end of the base a post 23 extends up and carries a head 24. A scale beam 25 is provided pivoted at 26 and carries weights 27. A hook rod connection 28 connects the scale beam with the platform levers. The post in the present instance is provided at the front with a socket 29 in which is mounted a tube 31 which constitutes the lower or fixed part of the height measuring device. Within this tube is mounted an inner tube 32 which constitutes the movable part of said height measuring device. A head 33 is provided at the top of this tube and through this head is mounted an arm 34 having a head contact member 35 adapted to contact with the head of a person standing on the scale 22 to give the height. The post 23 is relatively short so that the head 24 and beam 25 are somewhat lower than is usual in the ordinary platform scales.

All of the several parts mentioned are adapted to be taken apart and stored safely, compactly and readily in a container of suitcase type that I provide for the purpose.

Referring now to Figure 6, it will be noted that one or more thumb screws 36 are provided through a socket 37 extending up from the base and into which the lower end of the post 23 is positioned in service. This socket 37 has a recess 38 into which takes a positioning screw or projection 39 on the post.

The head 24 is provided with a socket 41 to fit down over the top of the post and a set screw 42 adapted to enter recess 43 in the socket 41 is carried by the post and may be tightened to carry the parts in adjusted relation.

The rod 28 is provided with hooks 44 at each end, one adapted to engage in the yoke 45 hung on knife edges 46 on the scale beam, and the other end to engage the lever system in the base.

The scale beam is engaged with a head 24 having knife edges 47 adapted to enter into open grooves 48 in supporting arm 49. Side plates 51 are screwed at the open ends of these grooves to maintain the body of the scale beam out of contact with the arms of the support 49.

The head 24 carries a socket 52 in line with the socket 29 of the base which socket 52 forms the other support for the height measuring device. The fixed tube or part 31 of the height measuring device is itself composed of separable sections, two such sections being provided in the present instance. Referring to Figure 12, reference character 53 indicates one (the upper) and reference character 54 the other (lower) such section. The section 54 is provided with a sleeve 55 extending up beyond the upper end of its body and into this sleeve is adapted to be positioned the lower end of the upper section, all as shown in Figure 5. Thus positioned, the contacting surfaces of the upper and lower sections are in smooth accurate registration, forming a single unitary member. The lengths of the sections are preferably such that the sleeve 55 is positioned just beneath the socket 52 on the scale head. The inner telescoping part is also composed of two sections as shown in Figures 12 and 8 to 10. In Figure 12 the part indicated by reference character 56 is the lower part and that indicated by reference character 57 the upper.

A threaded part 58, a reduced section, extends up from the part 56 and is adapted to be engaged within the lower end of the upper part 57. This threaded connection is shown in detail in Figures 8 to 10. The threaded part 58 is formed of a plug swaged or otherwise fastened in the upper end of the part 56 as shown. The threads in the upper part are provided within a supplementary short collar or sleeve 59 similarly fastened in the lower end of the upper part and adapted to receive the plug 58; the screwing together of these two parts providing a single inner telescoping part of smooth outer surface.

The upper tube or part 57 carries the head 33, this head having a stem 61 adapted to extend down into the part 57 in tight relation, being swaged or otherwise held in place. Through the head 33 is provided an opening 62 and in this opening is positioned the rod 34 carrying the head contact member 35 and set screw 63 is provided to hold the head contact member in position.

Means are provided to hold the height measuring device in any adjusted position, this provision in the present instance being accomplished by slitting the lower end of the inner telescoping part at 64 to set off part 65 which is caused to protrude outwardly to frictionally engage the inner face of the outer tube part of the height measuring device.

The outwardly protruding part 65 in the present instance consists of a tongue set off by the slits and having its end 66 bent in to contact with the tube at the opposite side and to thus stiffen or reinforce the engagement between the part 65 and the fixed part of the measuring device.

The scales shown on the drawing have a range of height measuring of a minimum of 39 inches and a maximum of 78 inches, and the inner tube is graduated throughout the length of both sections. At the lowermost position it measures 39 inches and indication of this circumstance is made at 67 on a collar 68 at the upper end of the tube part 31.

The scales and measuring device are adapted to be taken apart and stored in the suitcase type of container shown in Figures 1 and 2. This comprises a bottom part 71 into which the platform scale base may be received, this bottom part being substantially of a size to exactly and nicely receive the base and scales platform. Extending up from this bottom part 71 of the container, I provide a number of posts 72 adapted to lift the platform free of its lever support and as will be presently more fully explained, to aid in holding the platform against shaking or other movement in transport.

The container comprises a top portion 73 of appropriate depth and pivoted at 74 to the bottom part along one edge. Two cleats or yoke members 75 are provided in the top part, these yoke members having recesses 76, 77, 78 and 79. Combination yoke members 81 are provided and are adapted to be secured upon the yoke members 75 by suitable number of latches 82. These combination yoke members 81 have recesses 83 and 84 co-operating respectively with the recesses 76 and 79 but embracing certain of the scale parts as will be presently set forth.

The scale and height measuring device are taken apart by loosening the several set screws and disassembling them in a manner readily apparent. Thereafter the inner tube parts 56 and 57 may be inserted within the outer tube sections 53 and 54 and thus arranged placed within the post 23. The rod 34 with the head contact member 35 is also placed within the post 23 and this post is then placed in the recesses 79 of the yoke members 75. If desired the tube parts 56 and 57 may be inserted within the post without inserting them within the tube members 53 and 54 if it be found desirable to dimension the parts to permit this. The head 24 is then positioned in the recesses 76 of the yoke members as may be observed in Figure 1.

The scale beam is next placed in the recesses 77 and 78, these recesses being sufficient to accommodate the entire upper and lower graduated bars of the scale beam.

The co-operating yoke members 81 are then locked in place and the entire scale with the exception of the rod 28 is mounted within the container. This rod is now placed in position diagonally of the container part 73 resting in recesses 85, these recesses being of sufficient depth and narrowness to frictionally engage the rod and hold it in place.

The container may now be closed by moving the part 73 over on to part 71, suitcase or trunk locks 86 being provided to hold the container closed.

It will be manifest that the scales outfit is thus arrangeable in compact, convenient form for moving it from place to place and can be readily put together and taken apart.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A portable platform scale outfit, comprising, a demountable scale, and a carrying case, said demountable scale being arranged to have greater dimensions when set up than when demounted and said case being constructed to receive the separate scale parts when demounted and to retain said parts in fixed and predetermined positions.

2. A platform scale outfit, comprising, a demountable scale, a demountable height-measuring device attachable to said scale, and a case for transporting said scales and said height-measuring device, said scales and said height-measuring device being formed to fit within said case when collapsed and said case being formed to receive the parts of said scales and height-measuring device and to retain said parts in spaced relation.

3. A portable platform scale outfit, comprising a carrying case, a demountable scales of greater dimension, when set up, than the dimension of the case and comprising a scales platform, and detachable scale parts, said case being formed to receive said platform and detachable scale parts and being provided with means for engaging and supporting said scales platform.

4. A portable platform scale outfit, comprising a carrying case, a demountable scales of greater dimension, when set up, than the dimension of the case and comprising a scales platform, weighing levers supporting said platform, said case including means for supporting said platform in its normal position above but free of said levers.

5. A portable platfrom scale outfit, comprising a carrying case, a demountable scales of greater dimension, when set up, than the dimension of the case and comprising a scales platform, and weighing levers for supporting said platform said case comprising a body and a top, means in the body for supporting said scales platform in its normal position above but free of said levers, and means in the top for engaging and supporting said levers.

6. A portable platform scale outfit, comprising a carrying case, a demountable scales of greater dimension, when set up, than the dimension of the case and comprising a scales base and platform, a removable post, and a removable scales beam, said case being formed to receive said scales base, platform, removable post and removable scales beam and including means for embracing and holding said post and said beam in fixed position.

7. A scales outfit comprising a platform and base, a scales post, and a height measuring device associated therewith, said post being detachable from said scales base and said height measuring device being adapted to be contained within said post.

8. A scales outfit comprising a platform and base, a scales post, and a height measuring device associated therewith, said post being detachable from said scales base and said height measuring device comprising a fixed section and a moving part adapted to telescope therewith, said fixed part being comprised of separable sections.

9. A scales outfit comprising a platform and base, a scales post, and a height measuring device associated therewith said post being detachable from said scales base and said height measuring device comprising a fixed section and a movable part adapted to telescope therewith, said movable part being comprised of separable sections.

10. A scales outfit comprising a platform and base, a scales post, and a height measuring device associated therewith, said post being detachable from said scales base, and said height measuring device comprising a fixed part and a movable part adapted to telescope therewith, said parts being each of separable sections.

11. In combination with demountable weighing scales, a height measuring device comprising a pair of telescoping tubes, the inner of said tubes being slit to set off a tongue, said tongue being bent outwardly intermediate its ends to frictionally engage the inner face of the outer tube.

12. In combination with demountable weighing scales, a height measuring device comprising a pair of telescoping tubes, the inner of said tubes being slit to set off a tongue, said tongue being bent outwardly intermediate its ends to frictionally engage the inner face of the outer tube and the other end of said tongue engaging the inner face of the inner tube to reinforce the engagement between the said tubes.

13. A portable platform scale outfit, comprising, a scale base and platform assembly, a weight indicating assembly, a scale post for connecting said base and platform assembly and said weight indicating assembly, a telescoping height measuring device adapted to cooperate with said scale platform when assembled to indicate height, and a case built to receive and detachably hold the several parts in spaced relation when collapsed to facilitate the transportation thereof.

14. A portable platform scale outfit, comprising, a scale base and platform assembly, a weight indicating assembly, a scale post for connecting said base and platform assembly and said weight indicating assembly, a telescoping height measuring device adapted to be contained within said scale post when not assembled, and a case built to receive and detachably hold the several parts in spaced relation when collapsed to facilitate the transportation thereof.

15. A portable platform scale outfit, comprising, a scale base and platform assembly, a weight indicating assembly, a scale post for connecting said base and platform assembly and said weight indicating assembly, a telescoping height measuring device adapted to cooperate with said scale platform when assembled to indicate height, and a two part case for transporting the several parts in disassembled relation, comprising, a part adapted to receive the base and platform assembly, and a part adapted to contain and to maintain the remaining parts in spaced relation.

MATHIAS J. WEBER.